Figure 1:
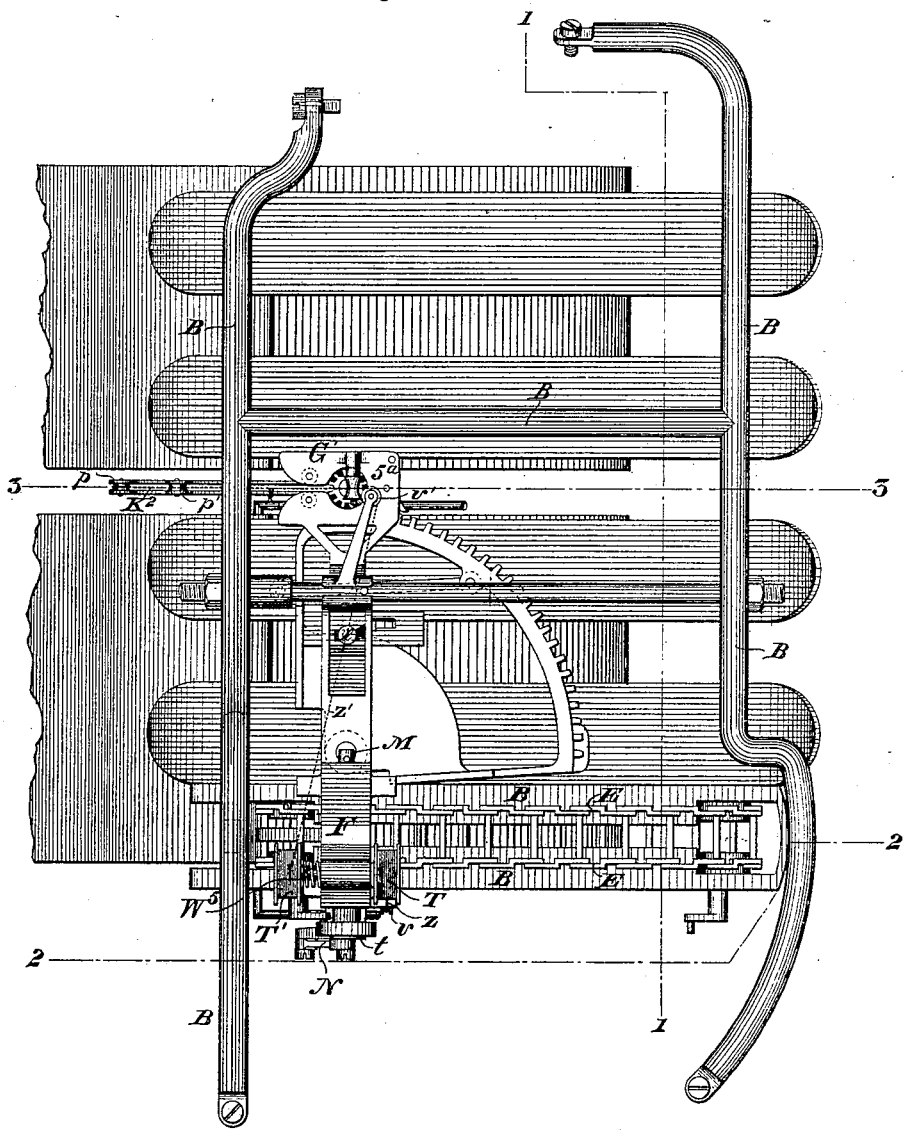

C. B. WITHINGTON.
Grain Binder.

No. 234,638.

Patented Nov. 16, 1880.

WITNESSES

INVENTOR
Charles B. Withington.
By his Attorneys

C. B. WITHINGTON.
Grain Binder.

No. 234,638. Patented Nov. 16, 1880.

WITNESSES
Wm A. Stinkle.
G.W. Breck.

INVENTOR
Charles B. Withington,
By his Attorneys.
Baldwin, Hopkins & Peyton

C. B. WITHINGTON.
Grain Binder.
No. 234,638.
4 Sheets—Sheet 3.
Patented Nov. 16, 1880.
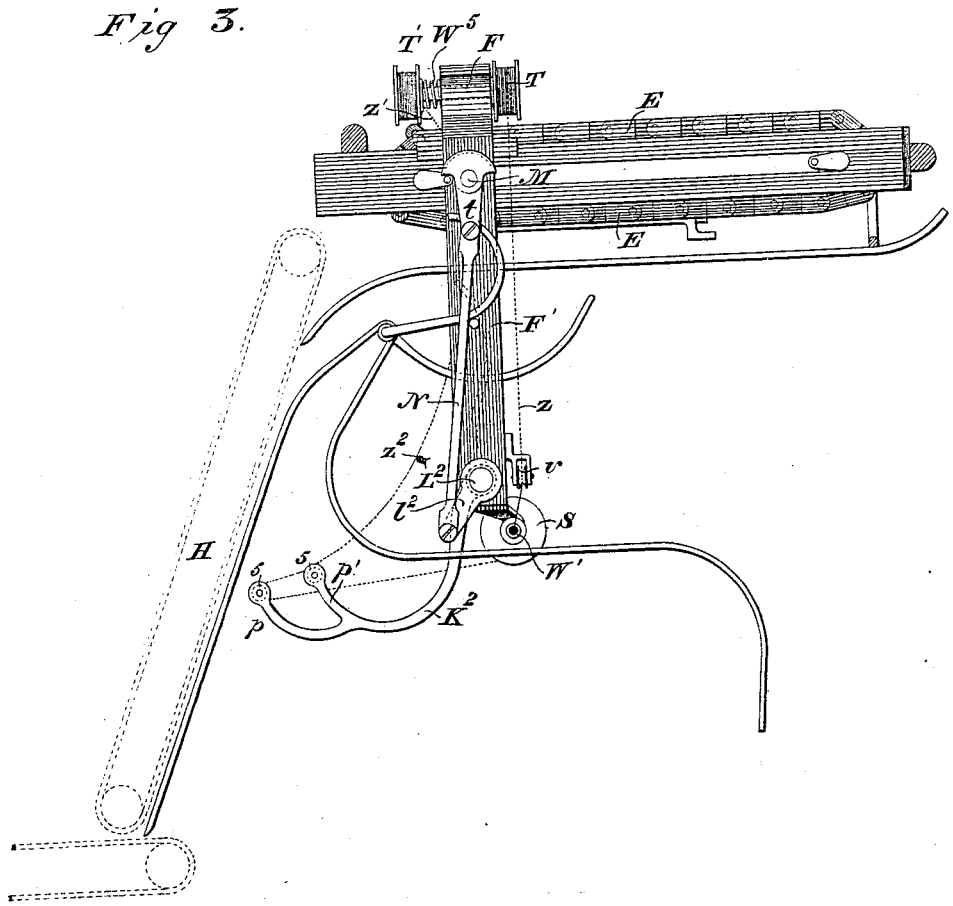
WITNESSES
Wm. A. Skinkle.
G. W. Breck.
INVENTOR
Charles B. Withington.
By his Attorneys.
Baldwin, Hopkins & Peyton C. B. WITHINGTON.
Grain Binder.
No. 234,638. Patented Nov. 16, 1880.
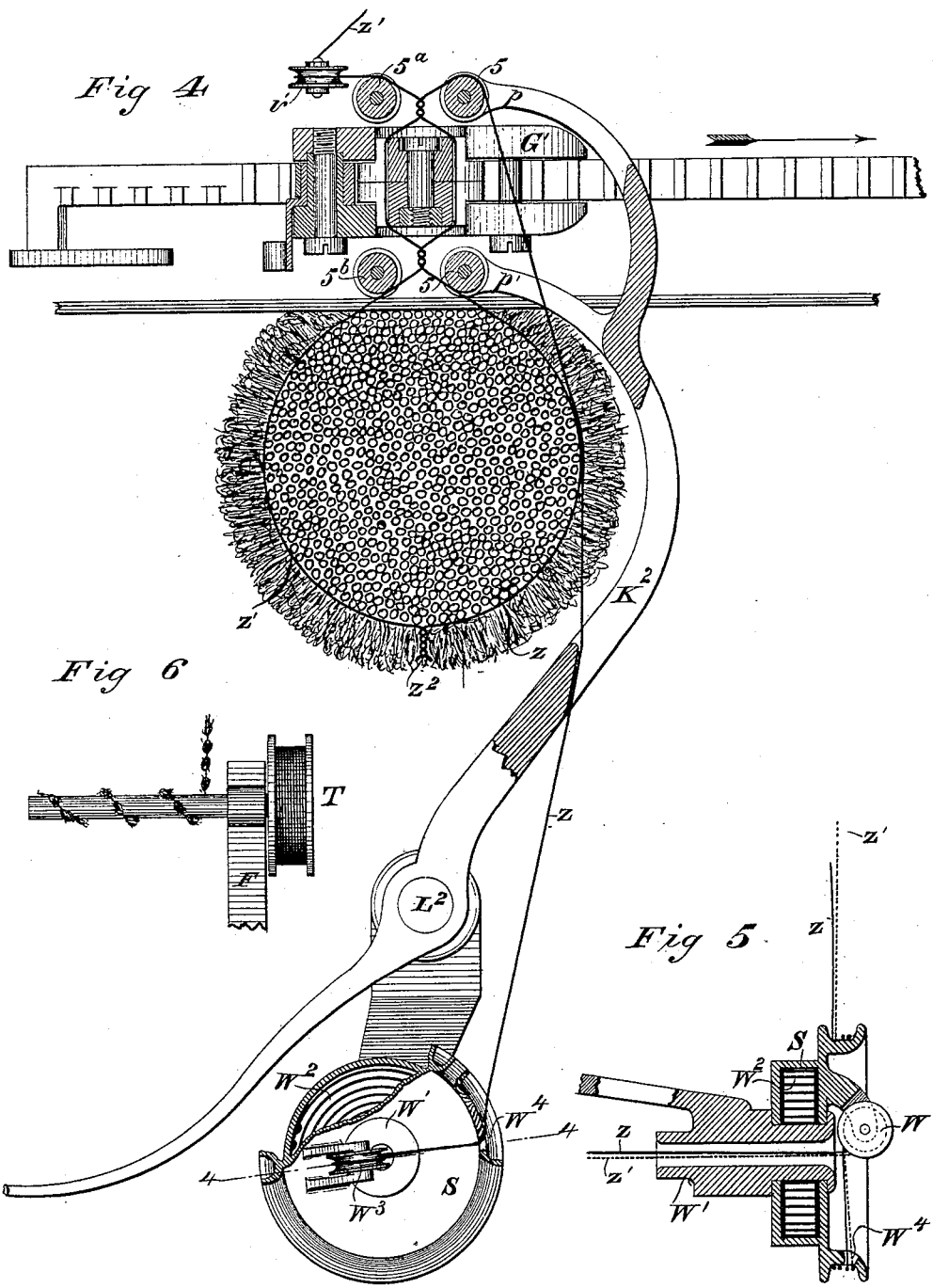

UNITED STATES PATENT OFFICE.

CHARLES B. WITHINGTON, OF JANESVILLE, WISCONSIN, ASSIGNOR TO CYRUS H. McCORMICK, LEANDER J. McCORMICK, AND ROBERT HALL McCORMICK, ALL OF CHICAGO, ILLINOIS.

GRAIN-BINDER.

SPECIFICATION forming part of Letters Patent No. 234,638, dated November 16, 1880.

Application filed March 5, 1874.

*To all whom it may concern:*

Be it known that I, CHARLES B. WITHINGTON, formerly of Lewisburg, in the county of Union and State of Pennsylvania, but now residing at Janesville, in the county of Rock and State of Wisconsin, have invented a new and useful Improvement in Grain-Binders, of which the following is a specification.

My invention consists in combining with a wire-reel, a grain-binding arm, and a binding-head a rotating spring tension-drum take-up between the reel and the binding-head, which take-up receives the wire by way of its hollow center and through an eye leading to its periphery, and has the wire then wound upon its periphery the number of times required to produce the requisite tension, whereby the slack of wire or other material used for binding, beyond the quantity required for each bundle, is retracted and wound back upon the drum by the action of the spring of the drum, and is thus kept in a condition for being used under the proper tension when another gavel is being bound.

The operation is such that as fast as the surplus wire is drawn from the drum an additional quantity of wire from the reel takes its place thereon, and thereby a uniform tension is maintained upon the wire, while the tension-drum is relieved from carrying around the weight of the reel of wire, and the wire between the tension-drum and reel is relieved from strain.

In the accompanying drawings, which represent so much of a grain-binding harvester as is necessary to illustrate the subject-matter herein claimed, my improvement is shown as embodied in a grain-binder adapted to the use of two wires, as shown in Letters Patent No. 123,967, granted to me February 20, 1872, and No. 186,186, granted January 9, 1877. This last-mentioned patent (the application for which constitutes a division of this one) fully describes the construction and operation of the machine, but disclaims the subject-matter herein claimed. Everything shown in that patent is disclaimed herein, except as specified in the claim at the end of this specification.

As the details of construction and operation of the machine are fully set forth in the above-mentioned Patent No. 186,186, it is deemed unnecessary to recapitulate them here.

Figure 2:
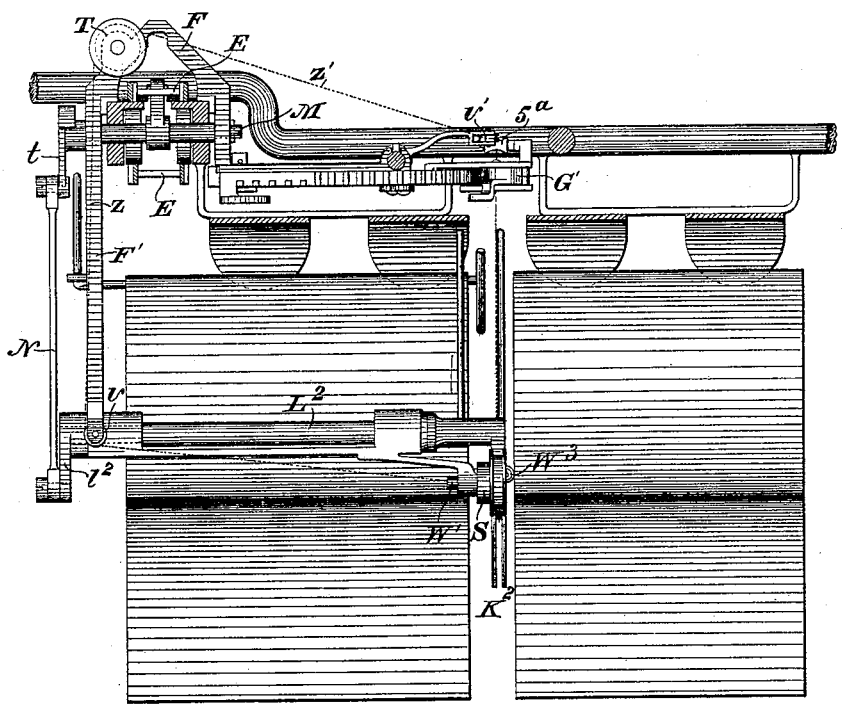

In the drawings, Figure 1 represents a plan or top view of so much of my improved apparatus as is necessary to illustrate the subject-matter herein claimed; Fig. 2, a vertical section therethrough on the line 1 1 of Fig. 1; Fig. 3, a section therethrough on the line 2 2 of Fig. 1; Fig. 4 a similar section on the line 3 3 of Fig. 1; Fig. 5, a vertical section through the tension-drum on the line 4 4 of Fig. 4, and Fig. 6 a view representing a modification of the reel and shaft—but as this modification is shown and described in my Patent No. 186,186 it need not be further described here.

The cut grain is conveyed from the platform (underneath the elevating-apron H) into a suitable receptacle. The binding mechanism proper in this instance is shown as mounted upon a carriage, F, reciprocating on suitable guideways mounted upon the frame B, and reciprocated by means of a traversing-chain, E, and slotted link rigidly secured upon and imparting intermittent rotating motion to a crank-shaft, M, mounted upon the traversing-carriage.

A binding-arm, $K^2$, vibrates with a rock-shaft, $L^2$, mounted upon a standard, F', secured upon the binding-carriage. A crank, $t$, on the crank-shaft M is connected by a pitman, N, with a crank of the rock-shaft $L^2$, above mentioned. The crank $t$, of course, revolves with its crank-shaft; but, being shorter than the crank $l^2$, the shaft $L^2$ is only rocked or vibrated, instead of being revolved, as it would be were the cranks of equal radius.

The wire-carrying arm $K^2$ is mounted on the inner end of the rock-shaft $L^2$, (see Fig. 2,) its outer extremity being bifurcated so as to form two prongs, $p\ p'$, carrying friction-pulleys on their ends. When the binding-arm is closed to carry the wire into the twister one of these prongs comes on each side of the twisting-head, as shown in Fig. 4.

A binding-head, G', is mounted upon the binding-carriage in proper relation to the binding-arm.

In the drawings the wire is shown as supplied from two reels, T T'. The wire $z'$ from the reel T' passes over a pulley, $v'$, and a roller, $5^a$, directly to the binding-head, while the wire $z$ from the reel T passes downward over a pulley, $v$, on the binding-carriage F to the wire-carrying arm $K^2$.

In order to preserve the proper tension on the binding-wire, it is passed through and around a tension-drum, S, arranged at a point intermediate between the wire-reel and the grain-binding head. This tension-drum may be located upon the reciprocating binding-frame, or on its supports, at any point found most convenient. It is shown as mounted on an arm projecting from the standard F'. The drum rotates upon a hollow arbor, W', between which and the drum is a coiled spring, $W^2$, secured at one end to the hollow arbor and at the other to the drum. The wire passes through the hollow arbor, around the guide-roller $W^3$, through a slot in the drum, being then wound one or more times around the periphery of said drum.

In Fig. 5 both wires are shown as thus carried through the tension-drum, one in full and the other in dotted lines.

The reels T T' are so constructed that one revolves with its shaft while the other is acted upon by a spring, $W^5$, Fig. 3, by which mode of construction one intermediate tension is made available for controlling the wire from both reels, while either may be operated separately when required.

The wire $z$, leading from the reel T, is shown in Fig. 2 as carried around the pulley $v$, through the hollow arbor of the tension-drum S, around its guide-pulley, through the hole in the flange of the drum, and around the periphery of the drum, around which the wire is wound spirally as often as the coils of the spring within the drum will permit, or as may be required in taking up the slack necessary to produce the required tension on the wire. The wire is carried from the drum over the pulley 5 of the upper fork, $p$, of the wire-carrying arm, and is united with the wire $z'$, which passes from the reel T', around the pulley $v'$, Fig. 2, thence over a friction-pulley through the slot of the binding-head, where it is united to the other wire, $z$, by twisting the ends of the wire together below the binding-head, as at $z^2$, Fig. 3.

The subsequent twisting operations are performed automatically.

As the gavels are bound wire is drawn from both reels T T', and as both are connected with the same shaft the wire paid out from the reel T' will be regulated by the movement of the reel T, which is intermittingly driven by the strain upon the wire by the wire-carrying arm. The wires pass over pulleys $5^a$ $5^b$ above and below the binding-head, as well as over the rollers 5 5 on the binding-arm.

Instead of having only one wire pass through the tension-drum, both wires may be thus passed through, and when this is done, as shown in Fig. 5, the tension upon both wires will be equal, and they will consequently pay out uniformly from both reels.

I am aware that intermediate take-up devices of various kinds have been employed in connection with braiding and sewing machines.

I am also aware that it has been proposed to use a simple spring-arm, through a loop in which the binding material is passed on its way to the binding-head from the spool; but I am not aware that prior to the date of my invention any intermediate take-up had been adapted to grain-binding machinery, which take-up possessed the function of winding backward upon itself or retracting the slack wire irrespective of the condition of the wire between the take-up and the wire-reel—that is, without exerting strain upon the wire between the reel and take-up, which is the particular characteristic or function of my take-up tension-drum, the advantage of which has been amply demonstrated in practice.

What I claim as my invention, and desire to secure by Letters Patent, is—

The combination, substantially as hereinbefore set forth, of a wire-reel, a wire-carrying arm, a binding-head, and a rotating spring tension-drum take-up intermediate between the wire-reel and binding-head, whereby the slack wire is retracted without strain upon the wire between the tension-drum and the wire-reel.

CHARLES B. WITHINGTON.

Witnesses:
J. N. CAMPBELL,
JAMES MARTIN, Jr.

Correction for Letters Patent No. 234,638.

Whereas, Letters Patent No. 234,638, dated November 16, 1880, were by a clerical error granted—under an assignment recorded in the Patent Office in Liber U19, pages 457 to 461—to "Cyrus H. McCormick, Leander J. McCormick, and Robert Hall McCormick;" and whereas it appears from said assignment that said Letters Patent should have been granted to the firm of "C. H. and L. J. McCormick;" therefore, it is hereby certified that the words "Cyrus H. McCormick, Leander J. McCormick, and Robert Hall," and the word "all" were erroneously inserted in lines 8 and 9, and the words "Cyrus H. McCormick, Leander J. McCormick, and Robert Hall" were erroneously inserted in line 16 of the grant of said Letters Patent, and in the caption of the specification thereof, and that the words "C. H. & L. J." were erroneously omitted in the same places, and that said words have this day been respectively cancelled and inserted in the proper places in the records of said Letters Patent in this Office, and in the said Letters Patent.

Signed, countersigned, and sealed this 18th day of December, A. D., 1880.

[SEAL.]

A. BELL,
*Acting Secretary of the Interior.*

Countersigned:
E. M. MARBLE,
*Commissioner of Patents.*